Oct. 28, 1947.  M. McCREARY  2,429,637
FISHLINE REEL
Filed Oct. 18, 1945
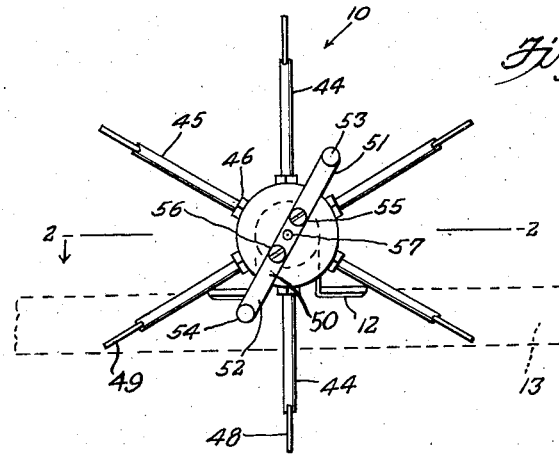
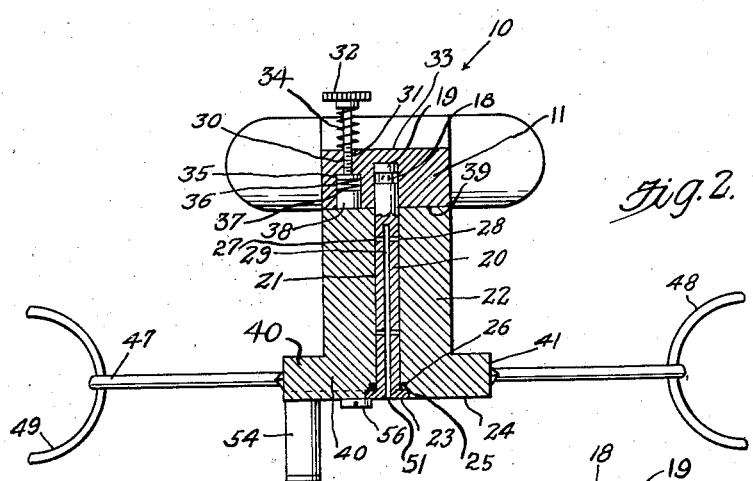
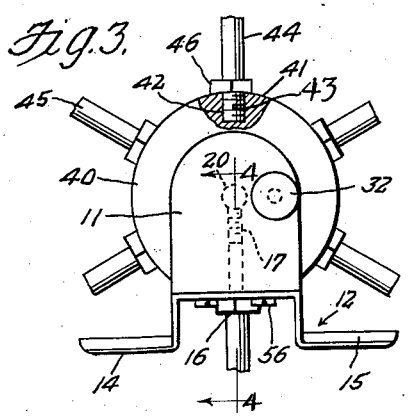
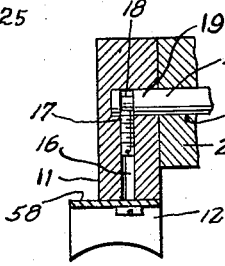
Inventor
Marcus McCreary
By Clarence A. O'Brien
and Harvey B. Jacobson
Attorneys Patented Oct. 28, 1947

2,429,637

UNITED STATES PATENT OFFICE 2,429,637

FISHLINE REEL

Marcus McCreary, Dexter, Mo.

Application October 18, 1945, Serial No. 622,967

6 Claims. (Cl. 242—84.5)

My invention as described herein, and illustrated in the accompanying drawings, consists of a fishing reel, an object of which is to provide a reel with a tension control therefor.

Another object of my invention is to provide a fishing reel all parts of which are renewable and any part of which may be replaced by a novice.

A further object of this invention is to provide in a fishing reel means for angular adjustment thereof relative to fishing rod.

Other features and advantages will become more readily apparent from the following description and the accompanying illustrative drawings in which:

Figure 1 is an elevational view of my reel,

Figure 2 is a sectional view on line 2—2 of Figure 1,

Figure 3 is a rear elevational view of the device, and

Figure 4 is a section on line 4—4 of Figure 3.

In the accompanying drawings, and in the following specification, the same reference characters are used to designate the same parts and elements throughout and in which 10, refers to my invention in its entirety and 11, indicates a supporting block having attached to its inner end a bracket 12, by means of which the block is connected to a fishing rod 13 (shown dotted). The arms 14 and 15, of the bracket are arcuate in cross section to fit the contour of the said rod. The bracket is secured to the block by a longitudinal screw bolt 16, the inner end 17, of which is adapted to seat in an annular groove 18, formed in the inner end 19, of a shaft 20, whereby the shaft is held to the block.

The shaft 20, projects through a bore 21, in the hub 22, its head 23, being countersunk into the surface 24, the countersink 25, of which is deep enough to also accommodate a gasket 26, to retain oil in the bore 21, which is fed thereinto through vents 27 and 28, from the longitudinal bore 29, of the shaft.

The block 11, is provided with the threaded bore 30, in which operates a screw 31, with a knurled head 32, between which and the surface 33, of block 11, is coiled a spring 34, upon the screw. The inner end of the screw is provided with a disk 35, seated in a counter-bore 36, in the block which disk presses upon a spring 37, which in turn bears upon a brake block 38, bearing against the inner surface 39, of the hub 22.

The outer end 40, of the hub 22, is enlarged in diameter and in the periphery 41, thereof are provided a series of spaced internally threaded bores 42, to receive the threaded ends 43, of spokes 44, 45, etc., which are secured in position by lock nuts 46. On the outer ends 47, of each of the spokes 45, etc., are secured transverse and aligning with each other semi-circular arms 48, 49, etc., for receiving the fishing line (not shown). Countersunk in the outer surface 24, of the enlargement 40, of the hub 22, and crossing the center thereof is a strap 50, the ends 51 and 52, of which project beyond the periphery 41, thereof and to which ends are pivotally connected handles 53 and 54, whereby the reel may be manipulated. The strap 50, is secured in place by screws 55 and 56, between which is an oil vent 57, aligning with bore 29, in the shaft 20. The reel 10, may be adjusted to any desired angle relative to the rod to which it is connected simply by loosening screw 16, and rotating block 11, upon the base 58, of bracket 12, after which the screw may again be tightened.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described my invention that which I claim as new and desire to procure by Letters Patent is:

1. The described reel comprising a hub with an enlarged rim, a series of spokes threaded in the periphery of the rim and locked in operative position, U-shaped arms carried by the spokes, a shaft upon which the hub is mounted, a block on which the shaft is carried, means in the block for securing said shaft, said means consisting of a screw operating through the block, a bracket to which the block is held by the screw and by means of which the block and bracket may be adjusted relative to one another, a brake for the hub, said brake operating through the block and engaging the inner surface of the hub, and means for adjusting the tension of the brake.

2. The described reel comprising a hub with an enlarged rim, a series of spokes threaded in the periphery of the rim and locked in operative position, U-shaped arms carried by the spokes, a shaft upon which the hub is mounted, a block on which the shaft is carried, means in the block for securing said shaft, said means consisting of a screw operating through the block, a bracket to which the block is held by the screw and by means of which the block and bracket may be adjusted relative to one another, a brake for the hub, said brake operating through the block and engaging the inner surface of the hub.

3. The described reel comprising a hub with an enlarged rim, a series of spokes threaded in the periphery of the rim and locked in operative position, U-shaped arms carried by the spokes, a shaft upon which the hub is mounted, a block on which the shaft is carried, means in the block for securing said shaft, said means consisting of a screw operating through the block, a bracket to which the block is held by the screw and by means of which the block and bracket may be adjusted relative to one another, and a brake for the hub, said brake operating through the block.

4. The described reel comprising a hub with an enlarged rim, a series of spokes threaded in the periphery of the rim and locked in operative position, U-shaped arms carried by the spokes, a shaft upon which the hub is mounted, a block on which the shaft is carried, means in the block for securing said shaft, said means consisting of a screw operating through the block, a bracket to which the block is held by the screw and by means of which the block and bracket may be adjusted relative to one another, and a brake for the hub.

5. The described reel comprising a hub with an enlarged rim, a series of spokes threaded in the periphery of the rim and locked in operative position, U-shaped arms carried by the spokes, a shaft upon which the hub is mounted, a block on which the shaft is carried, means in the block for securing said shaft, said means consisting of a screw operating through the block, and a bracket to which the block is held by the screw and by means of which the block and bracket may be adjusted relative to one another.

6. The described reel comprising a hub with an enlarged rim, a series of spokes threaded in the periphery of the rim and locked in operative position, U-shaped arms carried by the spokes, a shaft upon which the hub is mounted, a block on which the shaft is carried, means in the block for securing said shaft, said means consisting of a screw operating through the block, and a bracket to which the block is held by the screw.

MARCUS McCREARY.

REFERENCES CITED

The following references are of record in the file of this patent:

UNITED STATES PATENTS

| Number | Name | Date |
|---|---|---|
| 1,898,451 | Kelly | Feb. 21, 1933 |
| 1,139,252 | Bordner | May 11, 1915 |